United States Patent
McGee et al.

(10) Patent No.: US 8,431,198 B2
(45) Date of Patent: Apr. 30, 2013

(54) MULTILAYER COEXTRUDED SHRINK LABELS OF ORIENTED POLYSTYRENE FILM CONTAINING SMALL RUBBER PARTICLES AND LOW RUBBER PARTICLE GEL CONTENT AND BLOCK COPOLYMERS

(75) Inventors: Robert L. McGee, Midland, MI (US); Stephen J. Skapik, III, Columbus, OH (US); Julie R. Hatlewick, Saginaw, MI (US)

(73) Assignee: Dow Global Technologies Inc., Midland, MI (US)

( * ) Notice: Subject to any disclaimer, the term of this patent is extended or adjusted under 35 U.S.C. 154(b) by 435 days.

(21) Appl. No.: 12/680,862

(22) PCT Filed: Sep. 18, 2008

(86) PCT No.: PCT/US2008/076802
§ 371 (c)(1),
(2), (4) Date: Mar. 30, 2010

(87) PCT Pub. No.: WO2009/045737
PCT Pub. Date: Apr. 9, 2009

(65) Prior Publication Data
US 2010/0215877 A1    Aug. 26, 2010

Related U.S. Application Data

(60) Provisional application No. 60/997,213, filed on Oct. 2, 2007.

(51) Int. Cl.
*B65B 53/00* (2006.01)
*B29C 39/20* (2006.01)

(52) U.S. Cl.
USPC ...... 428/34.9; 428/220; 428/323; 264/173.16

(58) Field of Classification Search ............ 428/220, 428/323, 327, 34.9; 264/177.17
See application file for complete search history.

(56) References Cited

U.S. PATENT DOCUMENTS

| | | | |
|---|---|---|---|
| 5,322,664 A | 6/1994 | Blackwelder | |
| 5,753,326 A | 5/1998 | Blackwelder | |
| 6,413,596 B1 * | 7/2002 | Okuda et al. | 428/34.7 |
| 6,649,259 B1 | 11/2003 | Hu et al. | |
| 6,897,260 B2 | 5/2005 | Vynckier | |
| 7,824,773 B2 * | 11/2010 | McGee et al. | 428/519 |
| 2004/0242786 A1 | 12/2004 | Vynckier | |
| 2006/0084761 A1 | 4/2006 | Rego et al. | |

FOREIGN PATENT DOCUMENTS

| | | |
|---|---|---|
| EP | 1333043 | 8/2003 |
| GB | 862966 | 3/1961 |
| JP | 2000351860 | 12/2000 |
| JP | 2001290425 | 10/2001 |
| JP | 2002137292 | 5/2002 |
| JP | 2002146052 | 5/2002 |
| JP | 2003041090 | 2/2003 |
| JP | 2003094520 | 4/2003 |
| JP | 2003096262 | 4/2003 |
| JP | 2003155356 | 5/2003 |
| JP | 2003286352 | 10/2003 |
| JP | 2005139277 | 6/2005 |
| JP | 2005292195 | 10/2005 |
| WO | 9100583 | 1/1991 |
| WO | 2004072155 | 8/2004 |
| WO | 2006044114 | 4/2006 |
| WO | 2007016376 | 2/2007 |
| WO | 2008013542 | 1/2008 |

OTHER PUBLICATIONS

Gao et al., A novel application of using a commercial Fraunhofer diffractometer to size particles dispersed in a solid matrix, Journal of Applied Polymer Science, 2000, p. 1165-1168 vol. 77(5).

* cited by examiner

*Primary Examiner* — Gwendolyn Blackwell
*Assistant Examiner* — Yan Lan
(74) *Attorney, Agent, or Firm* — Stephen T. Falk

(57) ABSTRACT

A multilayer film comprises at least 3 layers including a first outer layer, a second outer layer and between the first and second outer layers at least one core layer. The first and second outer layers each comprise at least 75 weight percent of (a) at least one high impact polystyrene component. The core layer(s) comprises(s) (b) at least one styrene block copolymer that is present at a concentration of at least about 2 weight percent of the polymers in the film; and polymers (a), (b) and (c) at least one general purpose polystyrene having a Mw of more than 200,000 and 350,000 or less and that is present at a concentration of at least about 10 wt. % and up to at most about 50 wt. % of the polymers in the composition account for 100 percent by weight of the polymers in the polymer composition excluding polymeric additives.

11 Claims, No Drawings

MULTILAYER COEXTRUDED SHRINK LABELS OF ORIENTED POLYSTYRENE FILM CONTAINING SMALL RUBBER PARTICLES AND LOW RUBBER PARTICLE GEL CONTENT AND BLOCK COPOLYMERS

CROSS REFERENCE STATEMENT

This application claims the benefit of U.S. Provisional Application No. 60/997,213 filed Oct. 2, 2007.

BACKGROUND OF THE INVENTION

The present invention relates to oriented rubber-reinforced polystyrene film that has a preferential orientation in the stretched direction and a shrink film comprising such a polystyrene film, preferably multilayer film which is preferably coextruded.

Shrink labels generally fall into two categories: roll-on shrink-on labels and sleeve-type labels; sleeve labels are also sometimes referred to as tube labels. Roll-on shrink-on labels are film sheets that wrap around a container. Sleeve labels are tubular in configuration and fit around a container by placement over the container, such that the container is surrounded by the tube. Application of heat to a shrink label that is around a container causes the label to shrink and conform to the container.

To conform to a container, each type of label must shrink preferentially (that is, to a greater extent than in any other direction) in the direction extending circumferentially around the container. Roll-on shrink-on films usually reside on a container with the machine direction (MD) of the film extending circumferentially around the container. Hence, roll-on shrink-on films primarily shrink in the film's machine direction (MD) due to preferential machine direction orientation (MDO). In contrast, sleeve labels usually reside on a container with the label's transverse direction (TD) extending circumferentially around the container. Hence, sleeve labels shrink primarily in the film's transverse direction (TD) due to preferential transverse direction orientation (TDO).

Polystyrene (PS) is a particularly desirable polymer for shrink labels. Shrink label films of polypropylene (PP), for example, usually shrink only up to about 20 percent in any direction at a temperature below 120° C. The crystalline nature of PP requires heating above the PP's crystalline melt temperature to release additional orientation. In contrast, PS-based shrink label films only need to exceed the polymer's glass transition temperature (which generally is lower than PP's crystalline melt temperature) due to its amorphous character. Therefore, PS films can desirably provide greater shrink at lower processing temperatures than PP films.

Labels with glued seams require care to avoid shifting or loss of the label. Excess stress on the glued seam can cause the label to shift on the container or even separate from the container. Shrink labels, which either have no glue joint or have a glue joint that is extensively cured prior to application to a container, can tolerate greater stress. A very strong joint or seam can be formed in a polystyrene based film by using a solvent. These seams can tolerate greater stress during shrinkage. A seam in a PP shrink label cannot be formed using a solvent. Instead, glue is used. As a result the seams in PP labels are weaker and more likely to shift or be lost.

Additionally, PS retains a higher surface energy after corona treatment (often needed to render the surface of a polymer film suitable for printing) for extended periods of time relative to PP. Therefore, unlike PP films, corona treatment of PS films can occur during manufacture rather than just prior to printing into labels. Such flexibility in timing of corona treatment leads to significant efficiencies.

In contrast to copolyester and polyvinyl chloride (PVC) films, use of PS films facilitate bottle and label recyclability, as the lower density allows the label to be easily separated from the higher density (for example, polyester) bottles. Furthermore, the lower PS density advantageously provides a higher film yield, or more area/lb (or more area/kg) of film. Higher density label stocks, such as copolyester or PVC films, do not provide similar advantages.

Polystyrene-based shrink label films can include a high impact polystyrene (HIPS) component in order to improve label toughness (for example, tear resistance). However, rubber particles in a typical HIPS range have an average particle size of greater than one micrometer (see, for example, U.S. Pat. No. 6,897,260, column 4, lines 26-27). Large rubber particles tend to decrease clarity of a label film, interfering with the use of the film for reverse side printing (printing on the side of a label film proximate to the container so that it is readable through the film) as well as with viewing of the container or product through the label. Typical HIPS also contains greater than 7 percent rubber based on total HIPS weight. High concentrations of rubber can hinder the printability of a film, decrease clarity of a film, reduce dimensional stability and undesirably increase gel amount in a final film. However, in some situations such as small diameter bottles or bottle necks, HIPS alone may not supply sufficient toughness to avoid a tendency to split under stress.

However, styrene block copolymers that provide toughness often interfere with printing, seam sealing or both. Styrene block copolymers often contain higher portions of more expensive diene elastomers and are, therefore more expensive than high impact polystyrene (HIPS). Furthermore, relatively higher styrene content enhances recycle because styrene polymers separate from polymers typically used in making such containers as bottles by differences in density.

It would be desirable to have an oriented PS film that is suitable for shrink label applications, particularly having toughness sufficient for shrink labels as well as the ability to receive print and sealing by a variety of machinery. It would be desirable if such a film could serve as a shrink label that demonstrates circumferential shrink around a container comparable to that achieved with PVC or polyester. It would be desirable for the film to have seams more resistant to separation or shifting than glued seams in polypropylene film. It would be desirable to facilitate recycle of scrap, and edge trimmings. Further, it would be desirable to minimize total diene.

BRIEF SUMMARY OF THE INVENTION

The present invention advances shrink-label art by providing a multilayer oriented polystyrene-based film suitable for use as a shrink label and that contains a polystyrene block copolymer for improved toughness, impact resistance or a combination thereof, but the latter in limited quantities, especially in outer layers such that printing and sealing are facilitated as compared with use of higher quantities of styrene block copolymer. Further, the shrink film of the invention uses HIPS with a rubber particle size and rubber concentration below that of typical HIPS to improve clarity and surface smoothness. Use of all styrenic components is preferred to facilitate recycle of scrap and edge trimmings into the core layer. The present invention can provide a rubber-reinforced polystyrene film, and shrink label comprising such a film, that surprisingly has one or more of high clarity, adequate stiffness for high speed printing as indicated by preferred ranges of 1% secant modulus both MD and TD from 90,000 to 300,000 lb/in² (hereinafter psi) (620 to 2070 MPa), and high shrinkage in the direction of stretching as demonstrated by preferred ranges of shrink ratio from 20 to 80 percent in the primary stretched direction when measured in free air at 110° C. for 10 minutes.

In a first aspect, the present invention is a multilayer film comprising at least 3 layers, a first outer layer, a second outer layer and between the first and second outer layers at least one core layer wherein the first and second outer layers, and each comprises at least about 75 weight percent of (a) at least one high impact polystyrene (HIPS) component having: (i) a block copolymer of styrene and a rubbery conjugated diene, wherein the copolymer is grafted to a polystyrene; (ii) optionally, two weight-percent or more and 8 weight-percent or less of a rubber homopolymer based on the HIPS component weight; (iii) a total rubbery conjugated diene content of one weight percent or more and seven weight percent or less based on total weight of the HIPS component; (iv) less than 10 weight percent gel concentration by methyl ethyl ketone/methanol extraction; (v) an average rubber particle size of less than 1.0 micrometers and 0.01 micrometers or more; (vi) about 40 to about 90 volume percent of the rubber particles with diameters of less than about 0.4 microns and from about 10 to about 60 volume percent of the rubber particles with diameters between about 0.4 and about 2.5 microns; (vii) a majority of rubber particles with a core/shell morphology; and at least one core layer comprising (b) at least one styrene block copolymer that is present at a concentration of at least about 2 weight percent of the polymers in the film; and wherein polymers (a), (b) and (c) at least one general purpose polystyrene having a weight-average molecular weight of more than 200,000 grams per mole and 350,000 grams per mole or less, account for 100 percent by weight of the polymers in the total polymer composition of the film. The outer layers preferably each constitute at least about 3 to at most about 18 volume percent of the film. The core layer or layers preferably constitute at least about 64 volume percent of the film. The polymer composition of each layer is optionally admixed with additives within the skill in the art preferably at most about 15, more preferably at most about 10, or most preferably, when the film is transparent at most about 5 weight percent of the combined weight of polymer composition and additives to make a film composition, that is, a composition suitable for making films. The film is preferably an oriented film, more preferably the film has a shrink ratio in the primary direction stretched (usually MDO for roll-on shrink-on or TDO for sleeve applications) of at least about 3:1 and independently a ratio in the direction of less stretch of preferably at most about 1.2:1 and wherein the ratio in the direction that received more stretch is greater than the ratio in the other direction.

In another aspect, the present invention is a shrink label, tamper evident band, multi-pack unitizing, other shrink packaging or combination thereof, preferably a shrink label, comprising an axially unbalanced oriented polymer multilayer film (that is, a film having a different amount of orientation in the MD than in the TD) of the first aspect wherein the film preferably has printing on one or both sides, a seam or both. The shrink label is preferably either a roll on shrink on or a sleeve shrink label.

In another aspect the invention is a process for preparing a film or article comprising coextruding at least 2 outer layers comprising (a) at least one high impact polystyrene (HIPS) component having: (i) a block copolymer of styrene and a rubbery conjugated diene, wherein the copolymer is grafted to a polystyrene; (ii) optionally, two weight-percent or more and 8 weight-percent or less of a rubber homopolymer based on the HIPS component weight; (iii) a total rubbery conjugated diene content of one weight percent or more and seven weight percent or less based on total weight of the HIPS component; (iv) less than 10 weight percent gel concentration by methyl ethyl ketone/methanol extraction; (v) an average rubber particle size of less than 1.0 micrometers and 0.01 micrometers or more; (vi) about 40 to about 90 volume percent of the rubber particles with diameters of less than about 0.4 microns and from about 10 to about 60 volume percent of the rubber particles with diameters between about 0.4 and about 2.5 microns; (vii) a majority of rubber particles with a core/shell morphology; and at least one core layer comprising (b) at least one styrene block copolymer that is present at a concentration of at least about 2 weight percent of the polymers in the film; and wherein polymers (a), (b) and (c) at least one general purpose polystyrene having a weight-average molecular weight of more than 200,000 grams per mole and 350,000 grams per mole or less account for 100 percent by weight of the polymers in the polymer compositions used to make the film with the exception of optional additives, tie layers or a combination thereof.

DETAILED DESCRIPTION OF THE INVENTION

Films of the present invention are multilayer films comprising at least one HIPS component, at least one styrene block copolymer component and optionally at least one general purpose polystyrene (GPPS) component. The combination of the HIPS, styrene block copolymer, and GPPS components account for 100 percent by weight (weight percent) of the polymers in the film aside from additives and optional tie layers. When the polymer composition is less than 100 weight percent of the film weight, the balance to 100 weight percent consists of additives, including any additives that may be part of the HIPS component, GPPS, and styrene block copolymer components as obtained commercially or by manufacture and optional tie layers. Additives include any additive within the skill in the art, for instance fillers, processing aids, slip agents, or plasticizers within the skill in the art and optionally include polymeric additives. The additives within the skill in the art preferably at most about 15, more preferably at most about 10, or most preferably, when the film is transparent at most about 5 weight percent of the combined weight of polymer composition and additives to make a film composition, that is, a composition suitable for making films. Opaque films often include sufficient filler, such as titanium oxide to render the film opaque, preferably at least about 3, more preferably at least about 4, independently preferably at most about 10, more preferably at most about 6 weight percent filler. Optional tie layers are elaborated hereinafter.

All percentages, preferred amounts or measurements, ranges and endpoints thereof herein are inclusive, that is, "less than about 10" includes about 10. "At least" is, thus, equivalent to "greater than or equal to," and "at most" is, thus, equivalent "to less than or equal to." Numbers herein have no more precision than stated. Thus, "115" includes at least from 114.5 to 115.49. Furthermore, all lists are inclusive of combinations of two or more members of the list. All ranges from a parameter described as "at least," "greater than," "greater than or equal to" or similarly, to a parameter described as "at most," "up to," "less than," "less than or equal to" or similarly are preferred ranges regardless of the relative degree of preference indicated for each parameter. Thus a range that has an advantageous lower limit combined with a most preferred upper limit is preferred for the practice of this invention. All amounts, ratios, proportions and other measurements are by weight unless stated otherwise. All percentages refer to weight percent based on total composition according to the practice of the invention unless stated otherwise. Except in the examples, or where otherwise indicated, all numbers expressing quantities, percentages, functionalities and so forth in the specification are to be understood as being modified in all instances by the term "about." Unless stated otherwise or recognized by those skilled in the art as otherwise impossible, steps of processes described herein are optionally carried out in sequences different from the sequence in which the steps are discussed herein. Furthermore, steps optionally occur separately, simultaneously or with overlap in timing. For instance, such steps as heating and admixing are often separate, simultaneous, or partially overlapping in time in the art. Unless stated otherwise, when an element, material, or step capable of causing undesirable effects is present in amounts or in a form such that it does not cause the effect to an unacceptable degree it is considered substantially absent for the practice of this invention. Furthermore, the terms "unacceptable" and "unacceptably" are used to refer to deviation from that which can be commercially useful, otherwise useful in a given situation, or outside predetermined limits, which limits vary with specific situations and applications and can be set by predetermination, such as performance specifications. Those skilled in the art recognize that acceptable limits vary with equipment, conditions, applications, and other variables but can be determined without undue experimentation in each situation where they are applicable. In some instances, variation or deviation in one parameter can be acceptable to achieve another desirable end.

The term "comprising", is synonymous with "including," "containing," or "characterized by," is inclusive or open-ended and does not exclude additional, unrecited elements, material, or steps. The term "consisting essentially of" indicates that in addition to specified elements, materials, or steps; unrecited elements, materials or steps are optionally present in amounts that do not unacceptably materially affect at least one basic and novel characteristic of the subject matter. The term "consisting of" indicates that only stated elements, materials or steps are present except that unrecited elements, materials or steps may be present to an extent that has no appreciable effect, or are substantially absent.

The outer or skin layers of the multilayer film comprise at least one HIPS component having (i) a block copolymer of styrene and a rubbery conjugated diene, wherein the copolymer is grafted to a polystyrene; (ii) optionally, two weight-percent or more and 8 weight-percent or less of a rubber homopolymer based on the HIPS component weight; (iii) a total rubbery conjugated diene content of one weight percent or more and seven weight percent or less based on total weight of the HIPS component; (iv) less than 10 weight percent gel concentration by methyl ethyl ketone/methanol extraction; (v) an average rubber particle size of less than 1.0 micrometers and 0.01 micrometers or more; (vi) about 40 to about 90 volume percent of the rubber particles with diameters of less than about 0.4 microns and from about 10 to about 60 volume percent of the rubber particles with diameters between about 0.4 and about 2.5 microns; (vii) a majority of rubber particles with a core/shell morphology.

The HIPS component is a styrene polymer containing a grafted rubber component. Grafting of a rubber component into a polystyrene tends to increase toughness and mechanical strength of the polystyrene. Binding the rubber to the polystyrene through grafting has technical advantages over simply blending polystyrene with a rubber component. Binding the rubber usually provides a material with a higher modulus and equivalent impact strength with a lower rubber content than a simply blended rubber. Graft the rubber component into the styrene polymer by combining the rubber component with styrene monomers, often by dissolving the rubber in styrene monomers prior to polymerizing the styrene monomers. Polymerizing the styrene monomers then produces a matrix of polystyrene containing rubber grafted to styrene polymers.

The polystyrene matrix preferably has a sufficiently high weight average molecular weight (Mw) to provide a desirable level of processability and mechanical properties in the composition, which is advantageously a Mw of at least 100,000, preferably at least about 120,000, more preferably at least about 130,000 and most preferably at least about 140,000 grams per mole (g/mol). The polystyrene advantageously has a Mw that is less than or equal to about 260,000, preferably less than or equal to about 250,000, more preferably less than or equal to about 240,000 and most preferably less than or equal to about 230,000 g/mol in order to provide sufficient processability. Measure polystyrene matrix Mw by using gel permeation chromatography using a polystyrene standard for calibration.

The rubber component is a copolymer of a rubbery conjugated diene and styrene (rubber copolymer) or a blend comprising both the rubber copolymer and a minor amount of a rubbery conjugated diene homopolymer (rubber homopolymer). The conjugated diene in both rubbers is usually a 1,3-alkadiene, preferably butadiene, isoprene or both butadiene and isoprene, most preferably butadiene. The conjugated diene copolymer rubber is preferably a styrene/butadiene (S/B) block copolymer. Polybutadiene is a desirable rubber homopolymer.

The rubber copolymer desirably has a Mw of 100,000 g/mol or more, preferably 150,000 g/mol or more and desirably 350,000 g/mol or less, preferably 300,000 g/mol or less, more preferably 250,000 g/mol or less. Measure Mw using Tri Angle Light Scattering Gel Permeation Chromatography.

The rubber copolymer also desirably has a solution viscosity in the range of from about 5 to about 100 centipoise (cP) (about 5 to about 100 milliPascal-second (mPa*s)), preferably from about 20 to about 80 cP (about 20 to about 80 mPa*s); and cis content of at least 20%, preferably at least 25% and more preferably at least about 30% and desirably 99% or less, preferably 55% or less, more preferably 50% or less. Buna BL 6533 T brand rubber and other similar rubbers are desirable examples of rubber copolymers.

Including rubber homopolymer with a rubber copolymer when preparing the HIPS component can contribute to the mechanical performance of the HIPS polymer by enhancing the amount of elongation at rupture. Suitable rubber homopolymers desirably have a second order transition temperature of zero degrees Celsius (° C.) or less, preferably −20° C. or less. Preferably, the rubber homopolymer has a solution viscosity in the range of about 20 to about 250 cP (about 20 to about 250 mPa*s), more preferably from about 80 cP to 200 cP (about 80 to about 200 mPa*s). The rubber homopolymer desirably has a cis content of at least about 20%, preferably at least about 25% and more preferably at least about 30% and desirably about 99% or less, preferably 55% or less, more preferably 50% or less. Desirably rubber homopolymers have a Mw of 100,000 g/mol or more, more preferably 150,000 g/mol or more and desirably 600,000 g/mol or less, preferably 500,000 g/mol or less. Measure Mw by Tri Angle Light Scattering Gel Permeation Chromatography). An example of a suitable rubber homopolymer is Diene™ 55 brand rubber (Diene is a trademark of Firestone).

Rubber homopolymer, when present, will advantageously comprise at least about 2 weight percent, preferably at least about 4 weight percent, more preferably at least about 6 weight percent and most preferably at least about 8 weight percent based on total rubber weight in the HIPS polymer. In order to avoid unnecessarily low transparency or clarity, the rubber homopolymer content is desirably 25 weight percent or less, preferably 20 weight percent or less, more preferably 16 weight percent or less and most preferably 12 weight percent or less based on total rubber weight.

The HIPS component has a total diene-component content from the rubber component (that is, content arising from rubbery conjugated diene of both rubber copolymer and rubber homopolymer when preparing the HIPS component) of about one weight percent or more, preferably 1.5 weight percent or more, more preferably 2 weight percent or more, still more preferably 2.5 weight percent or more and most preferably 3 weight percent or more based on weight of the HIPS component. Rubber concentrations below about 1 weight percent fail to obtain a desirable level of mechanical strength and toughness. In order to provide desirable transparency, the rubber concentration is advantageously 7 weight percent or less, preferably 6 weight percent or less, more preferably 5 weight percent or less, even more preferably 4 weight percent or less, based on total weight of the HIPS component.

Without being bound by theory, lower rubber concentrations, such as 7 weight percent or less based on HIPS, is desirable to avoid extensive crosslinking in the rubber particle and reduce the likelihood of gel formation. While some crosslinking in the rubber is desirable to maintain the integrity of the rubber during shearing in manufacture, extensive crosslinking can hinder a rubber particle's ability to deform during film orientation. Clarity and transparency of a film increase as rubber particles deform into particles with higher aspect ratios. Rubber particles with less crosslinking tend to deform and retain their deformed shape more readily than higher crosslinked rubber particles, making the lower crosslinked particles more amenable to clear and transparent films. Defining a specific rubber concentration where crosslinking becomes undesirably extensive is difficult since it depends on specific processing conditions. Even so, rubber concentrations of 12 weight percent or more based on HIPS weight, tend to have undesirably extensive crosslinking.

Similarly, without being bound by theory, films of the present invention likely benefit from having a lower gel formation as a result of a lower rubber concentration. Gels form by extensive crosslinking of rubber agglomerates which fail to shear into small particles during film manufacture. Crosslinked gel agglomerates can cause difficulty in film manufacture, for instance by causing bubble breaks in a blown film process. Gel agglomerates also have a detrimental effect on film quality, appearing as non-uniform defects in the film and causing dimples in films wound over the agglomerate particle. The dimples tend to pose problems during printing by precluding ink reception on dimpled spots of a film's surface.

The HIPS component further has a gel concentration according to a methyl ethyl ketone/methanol extraction of less than 10 weight percent, relative to total HIPS component weight. Such a low gel concentration is desirable to maximize film clarity. Conduct the methyl ethyl ketone/methanol extraction similar to the method of Unexamined Japanese Patent Application Kokai Number P2000-351860A for determining gel concentration. In essence, dissolve a sample of the HIPS (sample weight is W1) into a mixed solvent methyl ethyl ketone/methanol (10:1 volume ratio) at room temperature (about 23° C.). Separate the insoluble fraction by centrifugal separation. Isolate and dry the insoluble fraction. The weight of the isolated and dried insoluble fraction is W2. The gel concentration in weight percent is 100×W2/W1.

The HIPS component has a volume average rubber particle size of less than one micrometer (μm), preferably 0.5 μm or less and advantageously 0.01 μm or more, preferably 0.1 μm or more and more preferably 0.3 μm or more. Such a volume average rubber particle size is in contrast to conventional HIPS materials, which have an average rubber particle size of at least one μm (see, for example, U.S. Pat. No. 6,897,260B2, column 4, lines 22-34; which illustrates the skill in the art and is incorporated herein by reference to the fullest extent permitted by law). Small rubber particle sizes are desirable because they tend to produce films with higher clarity and lower haze than films with larger rubber particles. However, rubber particles below 0.01 μm tend to contribute little to the durability of a composition despite their transparency and clarity.

The rubber particles in the HIPS component have a broad particle size distribution where the majority of the particles are smaller and only a limited amount of particles are larger. In particular, it is desirable to have a distribution where from about 40 to about 90 volume percent (vol %) of the particles have diameters less than about 0.4 μm. Correspondingly, it is desirable to have a distribution of relatively large particles where from about 10 to about 60 volume percent of the particles have diameters greater than about 0.4 μm and less than about 2.5, preferably from about 15 to 55 volume percent and more preferably from about 20 to about 50 volume percent of the particles have diameters greater than or equal to about 0.5 μm and less than or equal to about 2.5 μm. Preferably, for this component of relatively large particles, the specified percentage amounts of the particles have diameters less than about 2 μm, more preferably about 1.5 μm or less, still more preferably about 1.2 μm or less, even more preferably about 1 μm or less.

Rubber particle size is a measure of rubber-containing particles, including all occlusions of monovinylidene aromatic polymer within the rubber particles. Measure rubber particle size with a Beckham Coulter: LS230 light scattering instrument and software. The manufacturer's instructions and such literature as (JOURNAL OF APPLIED POLYMER SCIENCE, VOL. 77 (2000), page 1165, "A Novel Application of Using a Commercial Fraunhofer Diffractometer to Size Particles Dispersed in a Solid Matrix" by Jun Gao and Chi Wu) provide a method for measuring rubber particle size with the Beckham Coulter. Preferably, using this equipment and software, the optical model for calculating the rubber particle size and distribution statistics is as follows: (i) Fluid Refractive Index of 1.43, (ii) Sample Real Refractive Index of 1.57 and (iii) Sample Imaginary Refractive Index of 0.01.

The majority of the rubber particles, preferably 70% or more, more preferably 80% or more, more preferably 90% or more of the rubber particles in the HIPS component will have a core/shell particle morphology. Core/shell morphology means that the rubber particles have a thin outer shell and contain a single, centered occlusion of a matrix polymer. This type of particle morphology is commonly referred to as "single occlusion" or "capsule" morphology. In contrast, the terms "entanglement" or "cellular" morphology refer to various other, more complex rubber particle morphologies that include "entangled", "multiple occlusions", "labyrinth", "coil", "onion skin" or "concentric circle" structures. Determine the percentage of rubber particles having a core/shell morphology as a numerical percentages from 500 particles in a transmission electron micrograph photo of the HIPS component.

Core-shell particles in the HIPS component are crosslinked to the degree that they will stretch but not break under shear fields (that is, during an orientation process). Their thin walls (as a result of high compatibility coming from the presence of copolymer rubbers) will become even thinner but remain intact to provide the needed mechanical and tensile strength properties. Presumably, upon film orientation, the oriented rubber morphology is very close to a co-continuous distribution of very thin ribbons of rubber, possibly as a result of a low amount of multi-occlusion particles in the system (cellular morphology). The very thin shell walls have better light transmittance than would result with thicker walls and definitely better than if there were residual cellular or multi-occlusion particles, which do not distribute as very thin ribbons upon orientation.

The HIPS component is optionally free of or optionally contains other additives such as mineral oil or other plasticizers. Appropriate amounts of mineral oil can improve mechanical properties such as elongation at rupture. The HIPS component advantageously contains at least about 0.4 weight percent, preferably 0.6 weight percent or more, more preferably 0.8 weight percent or more and still more preferably 1 weight percent or more mineral oil based on total weight of the HIPS component. In order to obtain a desirable clarity, the HIPS component will advantageously contain less than about 3 weight percent, preferably 2.8 weight percent or less, more preferably 2.6 weight percent or less and most preferably 2.4 weight percent or less mineral oil based on total weight of the HIPS component.

A suitable material for use as the HIPS component is that described in U.S. Pregrant Publication 2006/0084761 entitled: "IMPROVED RUBBER MODIFIED MONOVINYLIDENE AROMATIC POLYMERS AND THERMOFORMED ARTICLES."

The HIPS component differs from standard, mass or solution polymerized HIPS in that the rubber particle size distribution is relatively broad and the majority of the rubber particles have a core-shell morphology. In contrast, conventional HIPS resins tend to have a relatively narrow particle size distribution and have predominantly or at least a larger percentage of cellular, multi-occlusion particle structure.

The core layer of the present invention comprises at least one styrene block copolymer. The term "styrene block copolymer or styrenic block copolymer" means a polymer having at least one block segment of a styrenic monomer in combination with at least one saturated or unsaturated rubber monomer segment, and more preferably not having a block of polymer that is neither rubber or styrenic. Suitable styrene block copolymers having unsaturated rubber monomer units include, but are not limited to, styrene-butadiene (SB), styrene-isoprene (SI), styrene-butadiene-styrene (SBS), styrene-isoprene-styrene (SIS), α-methylstyrene-butadiene-α-methylstyrene, and α-methylstyrene-isoprene-α-methylstyrene. The term "styrene butadiene block copolymer" is used herein inclusive of SB, SBS and higher numbers of blocks of styrene and butadiene. Similarly, the term "styrene isoprene block copolymer" is used inclusive of polymers having at least one block of styrene and one of isoprene. The structure of the styrene block copolymers useful in the present invention can be of the linear or radial type, and of the diblock, triblock or higher block type. In some embodiments the styrenic block copolymers having at least four different blocks or a pair of two repeating blocks, for example, repeating styrene/butadiene or styrene/ethylene propylene blocks, are desirable. Styrene block copolymers are well within the skill in the art and are commercially available from Dexco Polymers under the trademark VECTOR, from KRATON Polymers under the trademark KRATON, from Chevron Phillips Chemical Co. under the trademark SOLPRENE and K-Resin, and from BASF Corp. under the trade designation Styrolux. The styrene block copolymers are optionally used singly or in combinations of two or more.

The styrenic portion of the block copolymer is preferably a polymer or interpolymer of styrene or its analogs or homologs, including α-methylstyrene, and ring-substituted styrenes, particularly ring-methylated styrenes. Preferred styrenics are styrene and α-methylstyrene, with styrene being especially preferred.

The rubber portion of the block copolymer is optionally either unsaturated or saturated. Block copolymers with unsaturated rubber monomer units may comprise homopolymers of butadiene or isoprene and copolymers of one or both of these two dienes with a minor amount of styrenic monomer. When the monomer employed in butadiene, it is preferred that between about 35 and about 55 mole percent of the condensed butadiene units in the butadiene polymer block have a 1,2-configuration. When such a block is hydrogenated, the resulting product is, or resembles, a regular copolymer block of ethylene and 1-butene (EB). If the conjugated diene employed is isoprene, the resulting hydrogenated product is or resembles a regular copolymer block of ethylene and propylene (EP). Preferred block copolymers have unsaturated rubber monomer units, more preferably including at least one segment of a styrenic unit and at least one segment of butadiene or isoprene, with SBS and SIS most preferred. Among these, styrene butadiene block copolymers are preferred when a cast tenter line is used in manufacturing a film because it has higher clarity and lower haze as compared to SIS. However, in blown film processes, styrene isoprene block copolymers are preferred because of a lower tendency to crosslink forming gels during manufacture as compared to SBS.

Among styrene block copolymers, those which have one, preferably two or more preferably all three of clarity, impact resistance and elastomeric behavior are preferred.

Elastomeric styrene block copolymers are preferred in the practice of the present invention to provide toughness and lower stiffness than would be obtained in the absence of the block copolymer. Elastomeric behavior is indicated by a property of tensile percent elongation at break of advantageously at least about 70, preferably at least about 80, more preferably at least about 90, most preferably at least about 100 and preferably at most about 2000, more preferably at most about 1700, most preferably at most about 1500 percent as measured by the procedures of ASTM D-882. Industrially, most polymers of this type contain 10-80 weight percent styrene. Within a specific type and morphology of polymer, as the styrene content increases the elastomeric nature of the block copolymer decreases.

The block copolymers desirably have a melt flow rate (MFR) of at least about 2, preferably at least about 4 grams per 10 minutes (g/10 min) and desirably at most 20 g/10 min, preferably at most 30 g/10 min. Measure MFR according to ASTM method D1238 Condition G.

Preferred styrene block copolymers are highly transparent (have high, that is preferred ranges of, clarity), preferably having clarity when measured by ASTM D1003 corresponding to at least about 85%, preferably at least about 90% transmission of visible light. This transparency is believed to be due to the very small domain size, which is often of the order of 20 nm. In block copolymers the domain sizes are determined primarily by block molecular weights.

The styrene block copolymers also are preferably sufficiently puncture resistant to add durability in film applications as compared to the durability of films having the same composition (proportion of components) except without the styrene block copolymers. Puncture resistance is measured according to the procedures of ASTM D-3763 and preferably gives a value higher than about 8 in-lbs (0.9 J) when tested at 72° F. or 23° C.

A particularly preferred styrene butadiene block copolymer has a radial or star block configuration with polybutadiene at the core and polystyrene at the tips of the arms. Such polymers are referred to herein as star styrene butadiene block copolymers and are within the skill in the art and commercially available from Chevron Phillips Chemical Co. under the trade designation K-Resin. These polymers contain about 27 percent butadiene or more in a star-block form and often feature a bimodal molecular weight distribution of polystyrene. The inner polybutadiene segments are of about the same molecular weight while the outer polystyrene segments are of different molecular weight. This feature facilitates control of polybutadiene segment thickness, to obtain improved clarity. For high clarity, the polybutadiene segment thickness is preferably about one-tenth of the wavelength of visible spectrum or less.

The styrene block copolymer component is useful for improving toughness and lowering stiffness over that of a composition having the other components but not the block copolymer. However, incorporation of high amounts of a styrene-isoprene-styrene component can tend to obscure the clarity and transparency of the films.

The film of the present film optionally contains a crystal polystyrene, also called a general purpose polystyrene (GPPS). GPPS for use in the present invention desirably has a Mw of more than 200,000 g/mol, preferably 280,000 g/mol or more and 350,000 g/mol or less, preferably 320,000 g/mol or less. Measure Mw using to gel permeation chromatography and a known standard. The GPPS desirably has a melt flow rate (MFR) of at least about 2, preferably at least about 4 grams per 10 minutes (g/10 min) and desirably at most 20 g/10 min, preferably at most 30 g/10 min. Measure MFR according to ASTM method D1238. The GPPS may be free of or may contain plasticizing agents such as mineral oil, ethylene or propylene glycol, phthalates, or styrenic oligomers. Plasticizing agents, when present, are often present at a concentration of 4 weight percent or less, preferably 3 weight percent or less, based on GPPS weight. When present, the plasticizing agent often comprises one weight percent or more of the GPPS weight. Examples of suitable GPPS include STYRON™ 675 general purpose polystyrene (STYRON is a trademark of The Dow Chemical Company), STYRON™ 666, STYRON™ 668, and STYRON™ 693 general purpose polystyrenes.

The multilayer film of the invention comprises at least two outer or skin layers and at least one core layer between skin layers. While two skin layers, one on each side of the core layer or layers, are most preferred, the invention does not exclude structures wherein the skin is optionally made up of multiple layers, for instance microlayers. Similarly, the core layer is most preferably a single core layer, but is optionally made up of multiple layers as long as the combination of core layers has the described constitution. In addition to the outer and core layers, tie layers are optionally, but not preferably, used, especially between core and outer layers. The film is preferably at least about 1.0 mil, more preferably at least about 1.5 mil thick, and independently preferably at most about 4 mil, more preferably at most about 3.5 mil thick (25.4, 38.1, 101.6, and 88.9 microns thick, respectively). The each outer layer preferably is at least about 3, more preferably at least about 6, and independently preferably at most about 18, more preferably at most about 14, most preferably at least about 10 volume percent of the film (corresponding to the relative thicknesses within the film). The core layer or combination thereof is preferably at least about 64, more preferably at least about 74, most preferably at least about 80, and independently preferably at most about 94, more preferably at most about 85 volume percent of the film (corresponding to its relative thickness within the film). The remaining volume is that of the tie layers.

Each outer layer comprises at least one HIPS having (i) a block copolymer of styrene and a rubbery conjugated diene, wherein the copolymer is grafted to a polystyrene; (ii) optionally, two weight-percent or more and 8 weight-percent or less of a rubber homopolymer based on the HIPS component weight; (iii) a total rubbery conjugated diene content of one weight percent or more and seven weight percent or less based on total weight of the HIPS component; (iv) less than 10 weight percent gel concentration by methyl ethyl ketone/methanol extraction; (v) an average rubber particle size of less than 1.0 micrometers and 0.01 micrometers or more; (vi) about 40 to about 90 volume percent of the rubber particles with diameters of less than about 0.4 microns and from about 10 to about 60 volume percent of the rubber particles with diameters between about 0.4 and about 2.5 microns; (vii) a majority of rubber particles with a core/shell morphology. The outer layers each comprise preferably at least about 75, more preferably at least about 90 and independently preferably at most about 100 weight percent of the HIPS with the remainder made up of styrene block copolymer, general purpose polystyrene or a combination thereof.

The core layer or combination thereof comprises at least one styrene block copolymer. The core layer comprises preferably at least about 60, more preferably at least about 70 and independently preferably at most about 100, more preferably at most about 80 weight percent of the styrene block copolymer with the remainder made up of the HIPS, general purpose polystyrene or a combination thereof.

While preferably not needed or used, tie layers are optionally present between any 2 layers in the films of the invention. Any tie layer within the skill in the art for use between layers of styrenic polymer compositions is suitably used, for instance a copolymer of styrene and maleic anhydride and commercially available from NOVA Chemicals under the trade designation DYLARK™ 332. The tie layers combined are preferably at most about 1, more preferably at most about 2, most preferably at most about 4 and independently preferably at least about 0 or when used at least about 1 weight percent of the film of the invention.

Films of the present invention have orientation with preferential orientation in the direction that receives the most stretch as the film is formed or processed. The resulting film shrinks preferentially in the direction that is stretched more as the film is manufactured. Machine direction (MD) is along the direction of film transport during or after extrusion or blowing of the film. Transverse direction (TD) is perpendicular to the direction of film transport (MD). Shrinkage is preferentially machine direction orientation (MDO) if more stretch is applied to the MD than to the TD, and TDO if more stretch is applied transverse than machine direction. Preferential TDO causes a film of the present invention to shrink primarily in the TD upon application of heat, for instance in a sleeve label. Preferential MDO results in greater shrink in the machine direction than in the TD as is usually used for roll-on shrink-on labels.

Films of the present invention have an MDO or TDO ratio (ratio of oriented length to un-oriented length in the direction most stretched, MD or TD, respectively) advantageously of at least about 3:1, preferably at least about 4:1, more preferably at least about 5:1, still more preferably at least about 6:1 Films usually have a TDO ratio greater than their MDO ratio in order to be useful in shrink tube label applications or MDO ratio greater than TDO ratio in order to be useful in roll-on shrink-on label films. Films having a TDO for sleeve applications or MDO for roll-on shrink-on applications of less than 3:1 tend to have insufficient directional orientation (DO), either MDO or TDO depending on the use, to conform to a container in a shrink label application. There is no clear upper limit for draw ratio, although films often have a draw ratio of 10:1 or less. Films having a draw ratio greater than 10:1 risk shrinking around a container in a label application to such an extent that a glue seam holding the label around the bottle can weaken or fail.

Measure MDO ratio and TDO ratio by using an oriented film sample 4" (10.16 cm) in both MD and TD (that is, square samples). Place the sample in a heated air oven at 120° C. for 10 minutes and then measure MD and TD dimensions again. The ratio of pre-to-post-heated MD and TD dimensions correspond to MDO ratio and TDO ratio, respectively.

Films of the present invention desirably demonstrate a shrinkage at 110° C., preferably at 100° C., of at least about 20%, advantageously at least about 30%, advantageously at least about 40%, preferably at least about 50%, more preferably at least about 60%, most preferably at least about 70% in the more stretched direction. Shrinkage below 20% tends to undesirably limit the extent to which a film can conform to a container contour. While an upper limit on the extent of directional shrink is unknown, it will be below 100%.

Desirably, the films demonstrate a minimal opposite directional shrinkage or growth at 110° C., preferably at 100° C. of at most about 7 percent, more preferably at most about 5 percent, most preferably at most about 3 percent in the direction of least shrink. Extensive shrink or growth in the less stretched direction hinders the film's performance in shrink label applications by resulting wrinkling, the label pulling up at the bottom of the container, or in contraction of the film and, hence, distortion of the label in the other direction. Measure shrinkage according to ASTM method D-1204. Measure growth using test methods according to U.S. Pat. No. 6,897,260.

The presence of the HIPS in the outer layers provides films of the present invention with desirable printing and sealing characteristics as well as high clarity and transparency while at the same time enhancing the toughness of the films. Clarity and transparency are desirable in the label industry to provide a non-obscured view of a product around which the label resides. High clarity and transparency are also desirable for "reverse" printing of labels where printing resides between the label and the container and a consumer views the printing through the label. Advantageously, films of the present invention have clarity values at a film thickness of 2.0 mils (50 μm) of at least about 10, advantageously at least about 15, preferably at least about 20, more preferably at least about 25, most preferably at least about 30 when prepared on commercial equipment, that is, equipment used to manufacture commercial label films. Those skilled in the art recognize that thicker films will have less clarity than thinner films of the same composition made the same way. Measure clarity according to ASTM method D-1746.

Haze values also provide a measure of a film's observed clarity, with low haze corresponding to high clarity. Haze values for films of the present invention can range to any conceivable value. However, one advantage of the present invention is the ability to obtain oriented films with high clarity and low haze. Typical haze values for the present films at a film thickness of 2.0 mils (50 μm) are at most about 8, preferably at most about 6, more preferably at most about 4, most preferably at most about 2. Measure haze according to ASTM method D-1003.

Styrene block copolymers in the core layer according to the practice of the invention enhance toughness as indicated by measurements of tensile properties.

A styrene-based film advantageously has a higher secant modulus than, for example, oriented polypropylene or oriented polyvinyl chloride films. Increasing the secant modulus of a shrink label film is desirable to hinder the films likelihood of stretch during printing. As a result, films of the present invention can run at faster print speeds without risk of film breakage or distortion relative to a film with a lower secant modulus without the HIPS component. Films of the present invention have a one percent secant modulus in both the MD and TD of at least about 90,000 pounds-per-square-inch (psi) (620 MegaPascals (MPa)), preferably at least about 100,000 psi (690 MPa), more preferably at least about 150,000 psi (1,034 MPa). Measure one percent secant modulus by American Society for Testing and Materials (ASTM) method D-882.

Similar to films with high secant modulus, films with a high tensile stress at break, particularly in the MD, are desirable so that films can run faster and under higher tension in printing processes without stretching than films with a lower tensile stress. Desirably, films of the present invention have a tensile stress at break of at least about 2,000 psi (14 MPa), preferably at least about 2,500 psi (17 MPa), more preferably at least about 2750 psi (19 MPa) and most preferably at least about 3,000 psi (21 MPa). Measure tensile stress at break by ASTM D-882.

Films with a high tensile strain at break are desirable to allow printing and handling of the films with high speed processing equipment without splitting the film. Desirably, films of the present invention have a tensile strain at break in both directions of testing of at least about 20 percent, preferably at least about 30 percent, more preferably at least about 32 percent and most preferably at least about 34 percent. Measure percent strain at break by ASTM D-882. Desirably, films of the present invention have a toughness as measured by the procedures of ASTM D-882 of at least about 1000 psi (6.9 MPa), preferably at least about 1050 psi (7.2 Mpa), more preferably at least about 1100 psi (7.6 Mpa) and most preferably at least about 1200 psi (8.3 Mpa).

Films of the present invention advantageously have a thickness of at least about one mil (25 μm), preferably at least about 1.5 mils (38 μm) and advantageously at most about 4 mils (100 μm), preferably at most about 3.5 mils (88.9 μm). At a thickness of less than one mil (25 μm), films tend to be undesirably difficult to cut during processing and handling. Thicknesses greater than 4 mils (100 μm) are technically achievable, but generally economically undesirable.

Prepare films of the present invention by any means of oriented film manufacture including blown film processes and cast-tentering processes. Particularly desirable are blown film processes such as those described in U.S. Pat. No. 6,897,260 and Great Britain Patent (GBP) 862,966 (both of which are incorporated herein by reference). To make a multilayer film, coextrusion of compositions corresponding to the layers of the film of the invention is used rather than monolayer extrusion. In one embodiment, film is preferably coextruded into a tubular shape by means within the skill in the art such as that taught by U.S. Pat. No. 5,753,326.

To avoid unintended crosslinking, processing temperatures and residence times should be minimized. Melt temperatures are preferably below about 230° C., preferably below about 220° C., more preferably below about 210° C. The higher the process melt temperature, the shorter the time that polymer can be kept at that temperature before unacceptable degradation. For instance, exposure to temperatures in excess of about 230° C. is preferably limited to less than about 10 minutes, more preferably less than about 7 minutes, most preferably less than about 300 seconds.

A preferred process for preparing the films is a cast tentering method ("Process A"). First a film or sheet is cast, that is a self-supporting film or sheet is formed from melts supplied by a coextrusion system. The resin is extruded through a series of slits as a flat sheet, approximately 0.3-2.5 mm thick, onto a cooled, smooth cast roll at a temperature of from about 30 to about 70° C.) to form a multilayer film. The cast roll speed is adjusted to result in the thickness of film to from about 0.3 to about 1 mm thick. This film or sheet carried by rollers into a heated chamber containing a tenter frame. Air in the chamber is heated sufficiently to heat the film or sheet enough to permit stretch without tearing, at a temperature depending on composition of the film, approximately about 95° C. to about 150° C. A tenter frame has two side-by-side endless chains that diverge at constant angle. The film is held onto the chains by film clips. Divergence of the chains forces the polymer to stretch as it is transported along the chain, and imparts the desired orientation. Stretch rate is determined by the chain speed, divergence angle, and extent of orientation. The extent of orientation is determined by the ratio of the width of the film entering to the width of the film leaving the system to achieve amounts of stretch and corresponding shrink described previously. This imparts primarily TD orientation. The film is then annealed, if desired, and released. In most instances, edges of the film are slit off, ground, and recycled, and the film is optionally wound full width or split into narrower widths, which are optionally treated to improve printability and then wound onto rolls for further processing. If desired, machine direction orientation is imparted to the extent previously described, either by machine direction orientation by successively faster rollers at any stage when the film or sheet is sufficiently warm to permit stretch, such as when the film or sheet is formed and before quenching, when heated for TD orientation or in a separate step.

Films of the present invention have utility in any application that benefits from heat triggered shrinkage. The films have a particular utility as shrink labels. To convert a film of the present invention into a shrink label of the present invention, cut the film to a desirable width and corona treat a side of the film (in any order) and then print on the corona treated side of the film. Printing can reside on the "reverse" side of the film to create a reverse printed label. The reverse side of the film resides against a container and printing on the reverse side is viewed through the film when the film is around a container in a shrink label application. These steps are often done on a continuous web process, but suitably by any method within the skill in the art. The films are also useful for any other shrink application within the skill in the art, especially shrink applications benefiting from preferential shrink in one direction over the other, for instance for tamper evident bands, multi-pack unitizing, other shrink packaging applications or combinations thereof. These uses optionally involve or omit corona and print step.

Films and labels of the present invention can also advantageously possess perforations through the film or label. Perforations are most desirably located in the portion of a film proximate to the narrowest portion or portions of a container around which the film is applied. The perforations allow gas that would otherwise tend to become trapped between the label and container to escape, thereby allowing the label to more tightly conform to the container. Films, and labels, of the present invention can contain perforations uniformly distributed across a film surface or contain perforations specifically located proximate to the areas of the film (or label), advantageously to the area that will coincide with the narrowest portions of a container around which the film (or label) will reside. Perforation of films and labels of the present invention can be perforated at any time; however, in order to facilitate printing of labels, desirably perforate films and labels after printing.

Objects and advantages of this invention are further illustrated by the following examples. The particular materials and amounts thereof, as well as other conditions and details, recited in these examples should not be used to limit this invention. Unless stated otherwise all percentages, parts and ratios are by weight. Examples of the invention are numbered while comparative samples, which are not examples of the invention, are designated alphabetically.

EXAMPLES

HIPS-X Component for Examples 1-5 and Comparative Samples A-D

Examples 1-5 and Comparative Samples A-D, hereinafter, utilize HIPS-X as the HIPS component. Produce HIPS-X, for example, in the following continuous process using three agitated reactors working in series. Prepare a rubber feed solution by dissolving the rubber components of Table 1 into styrene at a rubber component ratio of 1 part Diene 55 to 15 parts Buna 6533 (that is, 0.3 weight percent Diene 55 and 4.5 weight percent Buna 6533 based on total rubber feed solution weight). Incorporate 2.5 weight percent mineral oil (70 centistokes kinematic viscosity) and 7 weight percent ethyl benzene with the rubber feed solution to form a feed stream, with weight percent relative to total feed stream weight. Add 0.1 weight percent Antioxidant Irganox 1076 to provide levels of about 1200 parts per million (ppm) in the final product. The balance of the feed is styrene to 100 weight percent. Supply the feed stream to the first reactor at a rate of 750 grams per hour (g/h). Target a rubber blend content in the feed stream and the feed rates of styrene and rubber to a reactor to produce a rubber-modified polystyrene product (HIPS-X) containing 4 weight percent butadiene.

Each of the three reactors has three zones with independent temperature control. Use the following temperature profile: 125, 130, 135, 143, 149, 153, 157, 165, 170° C. Agitate at 80 revolutions per minute (RPM) in the first reactor, 50 RPM in the second reactor and 25 RPM in the third reactor. Add 100 ppm of chain transfer agent (n-Dodecyl Mercaptan or nDM) into the second zone of the first reactor.

Use a devolatilizing extruder to flash out residual styrene and ethylbenzene diluent and to crosslink the rubber. The temperature profile for the devolatilizing extruder is 240° C. at the start of the barrel, medium zone of the barrel and final zone of the barrel. The screw temperature is 220° C.

Use the following test methods (or methods defined previously herein) to characterize HIPS-X: Melt Flow Rate: ISO-133. PS Matrix molecular weight distribution: PS calibration Gel Permeation Chromatography. Rubber Particle size: Light scattering using an LS230 apparatus and software from Beckman Coulter. Tensile Yield, Elongation and Modulus: ISO-527-2.

Determine the gel concentration of HIPS-X by methyl ethyl ketone extraction. For analyzing HIPS-X, dissolve a 0.25 gram sample of HIPS-X into a methyl ethyl ketone/ methanol mixture (10:1 volume ratio) by placing the sample and mixture into a tube of known weight and agitating on a wrist shaker for two hours at room temperature (23° C.). Isolate an insoluble fraction by placing the tube in a high speed centrifuge and spinning at 19500 revolutions per minute at 5° C. for one hour. Decant off excess liquid and place the tubes in a vacuum oven at 150° C. for 45 minutes at a vacuum of 2-5 millimeters of mercury. Remove the tubes from the oven and allow to cool to approximately 23° C. Weigh the tubes to determine, subtract the known weight of the tube to determine gel weight. The gel weight divided by 0.25 grams and multiplied by 100 provides the weight percent gel content relative to total HIPS-X weight.

TABLE 1

| Property | Conjugated Diene Copolymer rubber Buna BL 6533 T (trademark of Bayer) | Conjugated Diene Homopolymer Rubber Diene 55 (Trademark of Firestone) |
| --- | --- | --- |
| Styrene Content (%) | 40 | 0 |
| Vinyl Content (%) | 9 | 11 |
| Cis Content (%) | 38 | 38 |
| Viscosity (Mooney viscosity ML1 + 4 100° C. in Pascal-Seconds) | 45 | 70 |
| Solution Viscosity (5.43% in toluene) milliPascal-Seconds | 40 | 170 |
| Polymer Structure | AB Block copolymer | Generally linear |

HIPS-X has a volume average rubber particle size of 0.35 µm with 65 volume percent of the particle having a size of less than 0.4 µm and 35 volume percent of the particles having a size of 0.4-2.5 µm. HIPS-X has a rubber concentration of 0.38 weight percent butadiene homopolymer and 5.6 weight percent styrene/butadiene copolymer, for a combined rubber concentrations of 5.98 weight percent based on HIPS-X weight. HIPS-X has a gel concentration of approximately 8 weight percent, relative to total HIPS-X weight. HIPS-X contains 2 weight percent mineral oil, has a MFR of 7.0 g/10 min, Vicat temperature of 101° C., Tensile Yield of 20 megaPascals (Mpa), elongation at rupture of 25% and tensile modulus of 2480 Mpa.

The following materials are used in addition to HIPS-X in the Examples of the Invention and some Comparative Samples:

GPPS-1 is a general purpose polystyrene having a tensile modulus of greater than 400,000 psi (2750 Mpa) commercially available from The Dow Chemical Company under the trade designation STYRON™ 675 Polystyrene Resin.

BLOCK-1 is a styrene-butadiene (SB) block copolymer having a tensile modulus of less than 1600 Mpa commercially available from Chevron-Phillips Chemical Company under the trade designation K-Resin™ DK-11 styrene-butadiene-styrene resin.

General Procedure for Examples 1-5 and Comparative Samples A-D

In each of the following examples and samples, for each layer which is a combination of polymers, each component listed in Table 3 is in pellet form, scooped into a tumble blender where the components are mixed for about 2 minutes to form an admixture. No additives are added but it is recognized that some of the commercial polymers used may contain additives as commercially available. Each resulting admixture is placed into either one of two 1.25 inch (3.175 cm) skin layer extruders, a 1.5 inch (3.8 cm) skin layer extruder that is split between the skin layers, or a 2.5 inch (6.35 cm) core extruder further described as A, B, C or D, respectively, in the examples. Each extruder has a length to diameter (L/D) ratio of 30:1. The admixtures are heated as described in the separate examples by heaters integral to the extruders. That temperature is maintained until the film is cast through either a die with a 12 inch (30.5 cm) or 24 inch (61 cm) wide slit with a gap of 0.060 inches (0.10 cm) onto a water/glycol cooled smooth cast roll at a temperature of 180 to 195° F. (82 to 91° C.) unless stated otherwise in the example to form a multilayer film in each instance. The cast roll speed is adjusted to result in the thickness of film listed in each Example or Sample.

The cast tenter process takes place on laboratory scale cast tenter equipment commercially available from Parkinson Technologies Incorporated under the trade designation Parkinson Lab Line having the specifications in Table 2 and including casting machine with an extruder commercially available from Davis-Standard, LLC. The casting machine has all rolls 30 inch (76.2 cm) wide with a machine direction orienter, tenter frame, and oven. The beta scanning gauging system is commercially available from Eurotherm under the trade designation Eurotherm Beta Scanning Gauging System.

TABLE 2

| Description of Lab Line for Cast Tenter Processing |
| --- |
| Main Extruder Diameter: 2.5 inch (6.35 cm) |
| L/D (length/diameter) Ratio: 30:1 |
| Drive horse power: 50 (37.3 kW SI UNITS) |
| Max Motor Speed: 2340 RPM |
| Max Screw Speed: 140 RPM |
| Screw Design: Davis Standard Barrier Mixing Screw |
| Non-Vented |
| Key Filters Manual Screen Changer |
| 60 Mesh (310 micron) screen |
| Extrusion Dies Inc Sheet Die |
| Die Size: 12 inch (30.5 cm) or 24 inch (61 cm) |
| Lip Gap: 0.060 inch (152 cm) |
| Beta Scanning Gauging System |
| Upstream Strontium Gauge |
| Downstream Krypton Gauge |
| Pinning Method: Edge pin only |
| 2 Casting rolls: 18 inch (45.7 cm) diameter; |
| MDO (machine direction orienter) |
| 2 MDO Preheat rolls 18 inch (45.7 cm) diameter |
| 1 Slow Draw roll: 10 inch (25.4 cm) diameter; |
| 1 Fast Draw roll: 10 inch (25.4 cm) diameter |
| 1 Annealing Roll: 18 inch (45.7 cm) diameter; |
| 1 Cooling Roll: 18 inch (45.7 cm) diameter |
| Tenter Frame |
| Overall length: 45 Ft (13.7 m); Max Clip speed = 250 FPM (1.27 m/s) |
| 7 adjusting stations |
| Entry width Min./Max = 7.5 inches (19.05 cm) to 30 inches (76.2 cm) |
| Exit width Min./Max. = 8 inches (20.3 cm) to 86 inches (218.4 cm) |
| Oven Gas fired forced hot air) |
| Zones = 12 ft (3.66 m) Preheat, 5 ft (1.52 m) Stretch, 10 ft (3.05 m) Anneal |
| Pull roll Stand (roll width = 96 inches (243.8 cm)) |

Example 1

An ABA type film (that is a film having a core layer of composition B, with outer layers of composition A) is prepared with a layer profile of 13/73/14 (that is a relative layer thickness of 13 volume percent outer layer, 73 volume percent core layer and 14 volume percent second outer layer) with a skin formulation of 100 weight percent HIPS-X and a core layer of 100 weight percent BLOCK-1. The film is extruded using three extruders A, B and C with A and C being a 1.25 inch (3.2 cm) diameter design feeding the skin layers and B a 2.5 inch (6.35 cm) diameter extruder feeding the core layer. The film is cast onto a water/glycol cooled roll at 35 feet per minute (10.7 meters per minute) and at a width of 10.75 inch (27.3 cm) and thickness of 9.6 mils (244 micrometers) using melt temperature of 403° F. (206° C.) in A, 413° F. (212° C.) in B and 385° F. (196° C.) in C extruder. The film is then oriented in the transverse direction using a tenter frame as described previously included in Table 2. The film enters the starting end of the tenter frame at 10.36 inch (26.3 cm) width and exits the unit at 42.125 inch (107 cm) width. Film is stretched in the tenter oven at 220° F. (104° C.). The final film thickness is 2.03 mils (52 micrometers). The properties of the resulting film are in Table 4 and show good tensile strength and toughness and excellent haze.

Example 2

An ABA type film is prepared with a layer profile of 9/83/8 with a skin formulation of 100 weight percent HIPS-X and a core layer of 100 weight percent BLOCK-1. The film is extruded using three extruders A, B and C with A and C being a 1.25 inch (3.2 cm) diameter design feeding the skin layers and B a 2.5 inch (6.35 cm) diameter extruder feeding the core layer. The film is cast onto a water/glycol cooled roll at 35 feet per minute (10.7 meters per minute) and at a width of 10.75 inch (27.3 cm) and thickness of 9.6 mils (244 micrometers) using melt temperature of 403° F. (206° C.) in A, 414° F. (212° C.) in B and 383° F. (195° C.) in C extruder. The film is then oriented in the transverse direction using a tenter frame as described previously included in Table 2. The film enters the starting end of the tenter frame at 10.36 inch (26.3 cm) width and exits the unit at 41.125 inch (104.5 cm) width. Film is stretched in the tenter oven at 220° F. (104° C.). The final film thickness is 2.13 mils (54 micrometers). The properties of the resulting film are in Table 4 and show good tensile strength and toughness and excellent haze.

Example 3

An ABA type film is prepared with a layer profile of 10/79/11 with a skin formulation of 100 weight percent HIPS-X and a core layer of 75 weight percent BLOCK-1 and 25 weight percent HIPS-X. The film is extruded using two extruders called B and D, with D being a 1.5 inch (3.8 cm) diameter design feeding the skin layers and B a 2.5 inch (6.35 cm) diameter extruder feeding the core layer. The film is cast onto a water/glycol cooled roll at 19.5 feet per minute (5.94 meters per minute) and at a width of 21.935 inch (55.7 cm) and thickness of 10.3 mils (262 micrometers) using melt temperatures of 415° F. (213° C.) in B, and 383° F. (195° C.) in D extruder. The film is then oriented in the machine direction using a MDO unit as described previously included in Table 2. The film enters the starting end of the MDO unit at 21.9 inch (55.7 cm) width and exits the unit at 17.2 inch (43.8 cm) width. The MDO fast draw speed is 74.4 feet per minute (22.7 meters per minute) at a temperature of 232° F. (111° C.). The final film thickness is 3.4 mils (86 micrometers). The properties of the resulting film are in Table 4 and show good tensile strength and toughness and excellent haze.

Example 4

An ABA type film is prepared with a layer profile of 10/78/12 with a skin formulation of 100 weight percent HIPS-X and a core layer of 100 weight percent BLOCK-1. The film is extruded using two extruders called B and D, with D being a 1.5 inch (3.8 cm) diameter design feeding the skin layers and B a 2.5 inch (6.35 cm) diameter extruder feeding the core layer. The film is cast onto a water/glycol cooled roll at 19.5 feet per minute (5.94 meters per minute) and at a width of 22.125 inch (56.2 cm) and thickness of 9.9 mils (251 micrometers) using melt temperatures of 416° F. (213° C.) in B, and 385° F. (196° C.) in D extruder. The film is then oriented in the machine direction using a MDO unit as described previously including in Table 2. The film enters the starting end of the MDO unit at 22.1 inch (56.2 cm) width and exits the unit at 17.6 inch (44.8 cm) width. The MDO fast draw speed is 74.4 feet per minute (22.7 meters per minute) at a temperature of 229° F. (109° C.). The final film thickness is 3.13 mils (79.5 micrometers). The properties of the resulting film are in Table 4 and show good tensile strength and toughness and excellent haze.

Example 5

An ABA type film is prepared with a layer profile of 10/80/10 with a skin formulation of 100 weight percent HIPS-X and a core layer of 75 weight percent BLOCK-1 and 25 weight percent of GPPS-1. The film is extruded using two extruders called B and D, with D being a 1.5 inch (3.8 cm) diameter design feeding the skin layers and B a 2.5 inch (6.35 cm) diameter extruder feeding the core layer. The film is cast onto a water/glycol cooled roll at 19.5 feet per minute (5.94 meters per minute) and at a width of 21.935 inch (55.7 cm) and thickness of 10 mils (254 micrometers) using melt temperatures of 415° F. (213° C.) in B, and 383° F. (195° C.) in D extruder. The film is then oriented in the machine direction using a MDO unit as described previously included in Table 2. The film enters the starting end of the MDO unit at 21.9 inch (55.7 cm) width and exits the unit at 17 inch (43.2 cm) width. The MDO fast draw speed is 74.4 feet per minute (22.7 meters per minute) at a temperature of 234° F. (112° C.). The final film thickness is 3.29 mils (84 micrometers). The properties of the resulting film are in Table 4 and show good tensile strength and toughness and excellent haze.

Comparative Sample A

A monolayer film is prepared that contained a formulation of 75 weight percent BLOCK-1 and 25 weight percent HIPS-X. The film is extruded using three extruders A, B and C with A and C being a 1.25 inch (3.2 cm) diameter design feeding the skin layers and B a 2.5 inch (6.35 cm) diameter extruder feeding the core layer. In this example all three extruders contained the same formulation. The film is cast onto a water/glycol cooled roll at 35 feet per minute (10.7 meters per minute) and at a width of 10.75 inch (27.3 cm) and thickness of 10.1 mils (257 micrometers) using melt temperature of 390° F. (199° C.) in A, 413° F. (212° C.) in B and 385° F. (196° C.) in C extruder. The film is then oriented in the transverse direction using a tenter frame as described previously included in Table 2. The film enters the starting end of the tenter frame at 10.36 inch (26.3 cm) width and exits the unit at 42.125 inch (107 cm) width. Film is stretched in the tenter oven at 220° F. (104° C.). The final film thickness is 2.19 mils (56 micrometers). The properties of the resulting film are in Table 4 and show unacceptably high haze values.

Comparative Sample B

An ABA type film is prepared with a layer profile of 20/59/21 with a skin formulation of 100 weight percent HIPS-X and a core layer containing 100 weight percent BLOCK-1. The film is extruded using three extruders A, B and C with A and C being a 1.25 inch (3.2 cm) diameter design feeding the skin layers and B a 2.5 inch (6.35 cm) diameter extruder feeding the core layer. The film is cast onto a water/glycol cooled roll at 35 feet per minute (10.7 meters per minute) and at a width of 10.75 inch (27.3 cm) and thickness of 9.6 mils (244 micrometers) using melt temperature of 403° F. (206° C.) in A, 414° F. (212° C.) in B and 383° F. (195° C.) in C extruder. The film is then oriented in the transverse direction using a tenter frame as described previously included in Table 2. The film enters the starting end of the tenter frame at 10.36 inch (26.3 cm) width and exits the unit at 41.125 inch (104.5 cm) width. Film is stretched in the tenter oven at 220° F. (104° C.) The final film thickness is 2.03 mils (52 micrometers). The properties of the resulting film are in Table 4 and show excellent haze value but unacceptable tensile properties with lower than desired toughness in one direction.

Comparative Sample C

A monolayer type film is prepared that contained a formulation of 55 weight percent BLOCK-1, 30 weight percent HIPS-X, and 15 weight percent STYRON™ 675 GPPS. The film is extruded using two extruders called B and D, with D being a 1.5 inch (3.8 cm) diameter design feeding the skin layers and B a 2.5 inch (6.35 cm) diameter extruder feeding the core layer. The same formulation is used in both extruders. The film is cast onto a water/glycol cooled roll at 19.5 feet per minute (5.94 meters per minute) and at a width of 21.625 inch (54.9 cm) and thickness of 10.3 mils (262 micrometers) using melt temperatures of 415° F. (213° C.) in B, and 385° F. (196° C.) in D extruder. The film is then oriented in the machine direction using a MDO unit as described previously included in Table 2. The film enters the starting end of the MDO unit at 21.625 inch (54.9 cm) width and exits the unit at 18.625 inch (47.3 cm) width. The MDO fast draw speed is 74.4 feet per minute (22.7 meters per minute) at a temperature of 217° F. (103° C.). The final film thickness is 2.98 mils (76 micrometers). The properties of the resulting film are in Table 4 and show poor haze and toughness.

Comparative Sample D

An ABA type film is prepared with a layer profile of 11/79/10 with a skin formulation of 100 weight percent HIPS-X and a core layer of 60 weight percent BLOCK-1 and 40 weight percent of GPPS-1. The film is extruded using two extruders called B and D, with D being a 1.5 inch (3.8 cm) diameter design feeding the skin layers and B a 2.5 inch (6.35 cm) diameter extruder feeding the core layer. The film is cast onto a water/glycol cooled roll at 19.5 feet per minute (5.94 meters per minute) and at a width of 21.25 inch (54 cm) and thickness of 6.6 mils (168 micrometers) using melt temperatures of 417° F. (214° C.) in B, and 384° F. (196° C.) in D extruder. The film is then oriented in the machine direction using a MDO unit as described previously included in Table 2. The film enters the starting end of the MDO unit at 21.25 inch (54 cm) width and exits the unit at 18 inch (45.7 cm) width. The MDO fast draw speed is 113.5 feet per minute (34.6 meters per minute) at a temperature of 233° F. (112° C.). The final film thickness is 2.13 mils (54 micrometers). The properties of the resulting film are in Table 4 and show good haze but poor toughness and a high modulus.

Table 3 lists the constituents and profile of each film of Ex 1-5 and C.S. A-D.

Table 4 illustrates film properties for Examples (Ex) 1-5 and Comparative Samples (CS A-D. Use the following test methods to characterize films throughout the present disclosure. Measure Haze according to the procedures of ASTM method D-1003. Measure Clarity according to the procedures of ASTM method D-1746. Measure Tensile Stress and Strain, Toughness and Secant Modulus according the procedures of ASTM method D-882. Measure orientation release stress (ORS) according to the procedures of ASTM method D-2838. Measure Free Air Shrink according to the procedures of ASTM method D-1204.

TABLE 3

Layers of Films of Examples 1-5 and Comparative Samples A-D

| EX OR CS | TOTAL BLOCK-1 | TOTAL HIPS-X | TOTAL GPPS-1 |
| --- | --- | --- | --- |
| CS A | 75 | 25 | 0 |
| CS B | 59 | 41 | 0 |
| CS C | 55 | 30 | 15 |
| CS D | 47 | 21 | 32 |
| EX 1 | 73 | 27 | 0 |
| EX 2 | 83 | 17 | 0 |
| EX 3 | 59 | 41 | 0 |
| EX 4 | 78 | 22 | 0 |
| EX 5 | 60 | 20 | 20 |

TABLE 4

Properties of Films Resulting from Examples 1-5 and Comparative Samples A-D

| | Example or Sample number | | | | | | | | |
| --- | --- | --- | --- | --- | --- | --- | --- | --- | --- |
| | CS. A | CS. B | CS. C | CS. D | Ex 1 | E 2 | Ex 3 | Ex 4 | Ex 5 |
| Process and ratio | TDO 4:1 | TDO 4:1 | MDO 3.75:1 | MDO 3.75:1 | TDO 4:1 | TDO 4:1 | MDO 3.75:1 | MDO 3.75:1 | MDO 3.75:1 |
| thickness, mils | 2.19 | 2.03 | 2.98 | 2.13 | 2.03 | 2.13 | 3.40 | 3.13 | 3.29 |
| Thickness, μm | 55.63 | 51.56 | 75.69 | 54.10 | 51.56 | 54.10 | 86.36 | 79.50 | 83.57 |
| Layer Profile, % | monolayer | 20/59/21 | monolayer | 11/79/10 | 13/73/14 | 9/83/8 | 10/79/11 | 10/78/12 | 10/80/10 |
| Haze (%) | 13.60 | 2.30 | 5.30 | 2.70 | 2.50 | 2.20 | 3.10 | 4.20 | 2.90 |
| Tensile Stress at Break, MD psi | 4,030 | 3,350 | 11,590 | 9,750 | 3,170 | 3,500 | 9,380 | 8,525 | 10,250 |
| Tensile Stress at Break, MD, kPa | 27,790 | 23,100 | 79,910 | 67,220 | 21,860 | 24,130 | 64,670 | 58,780 | 70,670 |
| Tensile Stress at Break, TD psi | 8,400 | 10,140 | 2,600 | 2,770 | 8,770 | 7,625 | 2,410 | 3,125 | 2,880 |
| Tensile Stress at Break, TD, kPa | 57,920 | 69,910 | 17,930 | 19,100 | 60,470 | 52,570 | 16,620 | 21,550 | 19,860 |
| Tensile Strain at Break, MD % | 325.0 | 29.0 | 25.0 | 29.0 | 200.0 | 270.0 | 48.0 | 21.0 | 49.0 |

TABLE 4-continued

Properties of Films Resulting from Examples 1-5 and Comparative Samples A-D

| | Example or Sample number | | | | | | | | |
|---|---|---|---|---|---|---|---|---|---|
| | CS. A | CS. B | CS. C | CS. D | Ex 1 | E 2 | Ex 3 | Ex 4 | Ex 5 |
| Tensile Strain at Break, TD % | 60.0 | 29.0 | 32.0 | 14.0 | 34.0 | 39.0 | 50.0 | 170.0 | 115.0 |
| Toughness MD, psi | 9,570 | 1,005 | 2,120 | 2,300 | 5,900 | 7,505 | 3,270 | 1,280 | 3,610 |
| Toughness MD, kPa | 65,980 | 6,930 | 14,620 | 15,860 | 40,680 | 51,745 | 22,550 | 8,825 | 24,890 |
| Toughness TD, psi | 4,010 | 2,120 | 880 | 450 | 2,080 | 2,090 | 1,350 | 4,340 | 3,210 |
| Toughness TD, kPa | 27,650 | 14,620 | 6,070 | 3,100 | 14,340 | 14,410 | 9,310 | 29,920 | 22,130 |
| 1% Secant Modulus, MD, psi | 197,720 | 230,910 | 289,820 | 363,500 | 212,630 | 195,840 | 293,030 | 256,940 | 315,910 |
| 1% Secant Modulus, MD, kPa | 1,363,230 | 1,592,070 | 1,998,240 | 2,506,240 | 1,466,030 | 1,350,270 | 2,020,370 | 1,771,540 | 2,178,120 |
| 1% Secant Modulus, TD, psi | 208,475 | 297,650 | 193,560 | 249,800 | 247,280 | 217,075 | 185,440 | 161,680 | 203,970 |
| 1% Secant Modulus, TD, kPa | 1,437,380 | 2,052,220 | 1,334,550 | 1,722,310 | 1,704,940 | 1,496,680 | 1,278,560 | 1,114,740 | 1,406,320 |
| Free Air Shrink, MD 100° C., 10 min in % | −2 | −8 | 38 | 42 | −6 | −5 | 24 | 22 | 32 |
| Free Air Shrink, TD 100° C., 10 min in % | 56 | 45 | −1 | −6 | 48 | 46 | −5 | −5 | −4 |
| Free Air Shrink, MD 120° C., 10 min in % | 34 | 34 | 77 | 80 | 31 | 33 | 77 | 75 | 75 |
| Free Air Shrink, TD 120° C., 10 min in % | 78 | 80 | −6 | −7 | 80 | 80 | −11 | −11 | −7 |

The invention claimed is:

1. A multilayer film comprising at least 3 layers, a first outer layer, a second outer layer and, between the first and second outer layers, at least one core layer
    wherein the first and second outer layers each are from 3 to 18 volume percent of the film and each comprises: at least about 75 weight percent of (a) at least one high impact polystyrene (HIPS) component having:
    (i) a block copolymer of styrene and a rubbery conjugated diene, wherein the copolymer is grafted to a polystyrene;
    (ii) optionally, two weight-percent or more and 25 weight-percent or less of a rubber homopolymer based on the total rubber weight in the HIPS component;
    (iii) a total rubbery conjugated diene content of one weight percent or more and seven weight percent or less based on total weight of the HIPS component;
    (iv) less than 10 weight percent gel concentration by methyl ethyl ketone/methanol extraction;
    (v) an average rubber particle size of less than 1.0 micrometers and of 0.01 micrometers or more;
    (vi) about 40 to about 90 volume percent of the rubber particles with diameters of less than about 0.4 microns and from about 10 to about 60 volume percent of the rubber particles with diameters between about 0.4 and about 2.5 microns;
    (vii) a majority of rubber particles with a core/shell morphology;
    and the at least one core layer comprises from 64 to 94 volume percent of the film and comprises (b) at least about 70 weight percent of at least one styrene block copolymer;
    and wherein polymers (a), and (b) and optionally (c) at least one general purpose polystyrene (GPPS) having a weight-average molecular weight of more than 200,000 grams per mole and 350,000 grams per mole or less, account for 100 weight percent of the polymers in the film with the exception of optional additives, tie layers or a combination thereof.

2. The film of claim 1 wherein the skin or outer layers comprise from 80 to 100 weight percent of the at least one HIPS described as (a) in claim 1.

3. The film of claim 1 wherein in addition to the at least one HIPS described as (a), the skin or outer layers consist essentially of at least one styrene block copolymer described as (b), at least one GPPS described as (c) or a combination thereof.

4. The film of claim 1 wherein in addition to the at least one styrene block copolymer described as (b), the core layer or layers consist essentially of at least one HIPS described as (a), at least one GPPS described as (c) or a combination thereof.

5. The film of claim 1 wherein the at least one core layer comprises up to 80 weight percent of the at least one styrene block copolymer.

6. The film of claim 1 wherein the shrink ratio in the direction of more stretch is more than about 3:1.

7. An article comprising the film of claim 1.

8. The article of claim 7 wherein the article is at least one shrink label, tamper evident band, multi-pack unitizing, other shrink packaging or combination thereof.

9. A process for preparing a film or article comprising coextruding:
  at least 2 outer layers that each are from 3 to 18 volume percent of the film, each comprising (a) at least about 75 weight percent of at least one high impact polystyrene (HIPS) component having:
  (i) a block copolymer of styrene and a rubbery conjugated diene, wherein the copolymer is grafted to a polystyrene;
  (ii) optionally, two weight-percent or more and 25 weight-percent or less of a rubber homopolymer based on the total rubber weight in the HIPS component;
  (iii) a total rubbery conjugated diene content of one weight percent or more and seven weight percent or less based on total weight of the HIPS component;
  (iv) less than 10 weight percent gel concentration by methyl ethyl ketone/methanol extraction;
  (v) an average rubber particle size of less than 1.0 micrometers and of 0.01 micrometers or more;
  (vi) about 40 to about 90 volume percent of the rubber particles with diameters of less than about 0.4 microns and from about 10 to about 60 volume percent of the rubber particles with diameters between about 0.4 and about 2.5 microns;
  (vii) a majority of rubber particles with a core/shell morphology; and
  at least one core layer comprising from 64 to 94 volume percent of the film and comprising (b) at least about 70 weight percent of at least one styrene block copolymer;
  and wherein polymers (a), and (b) and optionally (c) at least one general purpose polystyrene having a weight-average molecular weight of more than 200,000 grams per mole and 350,000 grams per mole or less account for 100 percent by weight of the polymers in the polymer compositions used to make the film with the exception of optional additives, tie layers or a combination thereof.

10. The process of claim 9 wherein coextrusion is followed by preferential stretching in the machine or transverse direction.

11. The process of claim 9 which comprises a cast process.

* * * * *